(12) United States Patent
Jaradi et al.

(10) Patent No.: US 10,889,257 B2
(45) Date of Patent: Jan. 12, 2021

(54) VEHICLE SEAT ASSEMBLY

(71) Applicant: Ford Global Technologies, LLC, Dearborn, MI (US)

(72) Inventors: Dean M Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 59 days.

(21) Appl. No.: 16/287,640

(22) Filed: Feb. 27, 2019

(65) Prior Publication Data

US 2020/0269798 A1    Aug. 27, 2020

(51) Int. Cl.
| | |
|---|---|
| *B60R 21/18* | (2006.01) |
| *B60R 21/207* | (2006.01) |
| *B60R 21/2338* | (2011.01) |
| *B60R 21/231* | (2011.01) |
| *B60R 21/00* | (2006.01) |

(52) U.S. Cl.
CPC .......... *B60R 21/18* (2013.01); *B60R 21/207* (2013.01); *B60R 21/2338* (2013.01); *B60R 2021/0009* (2013.01); *B60R 2021/23146* (2013.01); *B60R 2021/23382* (2013.01)

(58) Field of Classification Search
CPC ... B60R 21/18; B60R 21/207; B60R 21/2338; B60R 2021/0009; B60R 2021/23382; B60R 2021/23146
See application file for complete search history.

(56) References Cited

U.S. PATENT DOCUMENTS

| | | | |
|---|---|---|---|
| 6,343,810 B1 | 2/2002 | Breed | |
| 7,021,654 B2 | 4/2006 | Honda et al. | |
| 8,286,995 B2 | 10/2012 | Shibayama et al. | |
| 8,616,578 B2 | 12/2013 | Ohrai | |
| 9,744,933 B1 * | 8/2017 | Rao | B60R 21/01554 |
| 2006/0290114 A1 * | 12/2006 | Suyama | B60R 21/18 280/733 |
| 2012/0101688 A1 * | 4/2012 | Sugiyama | B60R 21/18 701/45 |
| 2013/0313811 A1 * | 11/2013 | Ichida | B60R 21/18 280/733 |
| 2015/0091283 A1 * | 4/2015 | Yamanaka | B60R 21/2338 280/733 |
| 2016/0280171 A1 * | 9/2016 | Moeller | B64D 11/06205 |
| 2016/0297396 A1 * | 10/2016 | Moeller | B60R 21/233 |

(Continued)

FOREIGN PATENT DOCUMENTS

| | | | |
|---|---|---|---|
| DE | 3631881 A1 | | 4/1988 |
| JP | 4407644 B2 | | 8/2007 |
| JP | 2007223524 A | * | 9/2007 |

*Primary Examiner* — Darlene P Condra
(74) *Attorney, Agent, or Firm* — Frank A. MacKenzie; Bejin Bieneman PLC

(57) ABSTRACT

A seat includes a seat back and an airbag mounted to the seat back. A seatbelt webbing has a shoulder band and a lap band. The airbag is inflatable to an inflated position between the seat back and the shoulder band. When the airbag is inflated, the airbag exerts a force on the shoulder band to loosen the shoulder band across a chest of the occupant, e.g., during an angular impact in which the momentum of the occupant urges the shoulder and chest of the occupant to turn into the shoulder belt.

20 Claims, 4 Drawing Sheets

(56) References Cited

U.S. PATENT DOCUMENTS

2017/0036633 A1* 2/2017 Kobayashi .............. B60R 21/18
2017/0106828 A1* 4/2017 Isozaki ............... B60R 21/2338
2017/0136975 A1* 5/2017 Nakashima ............. B60R 22/12

* cited by examiner

VEHICLE SEAT ASSEMBLY

BACKGROUND

Vehicles are subject to impact testing for different types of collisions. Angular vehicle impacts may urge the occupant forward and may urge the shoulders of the occupant to twist. In one example, a test procedure simulates an impact of a test vehicle from another vehicle at an oblique angle. The test procedure provides that a moving deformable barrier impacts the test vehicle with a speed of 56 miles per hour (mph) with a 35% overlap from a center of a front of the test vehicle and at an angle of 15° from a vehicle-forward direction. This test has been proposed by the National Highway Traffic Safety Administration (NHTSA) for inclusion in the United States New Car Assessment Program (US-NCAP). Other examples of angular impact include small offset rigid barrier (SORB).

DETAILED DESCRIPTION

Figure 1:
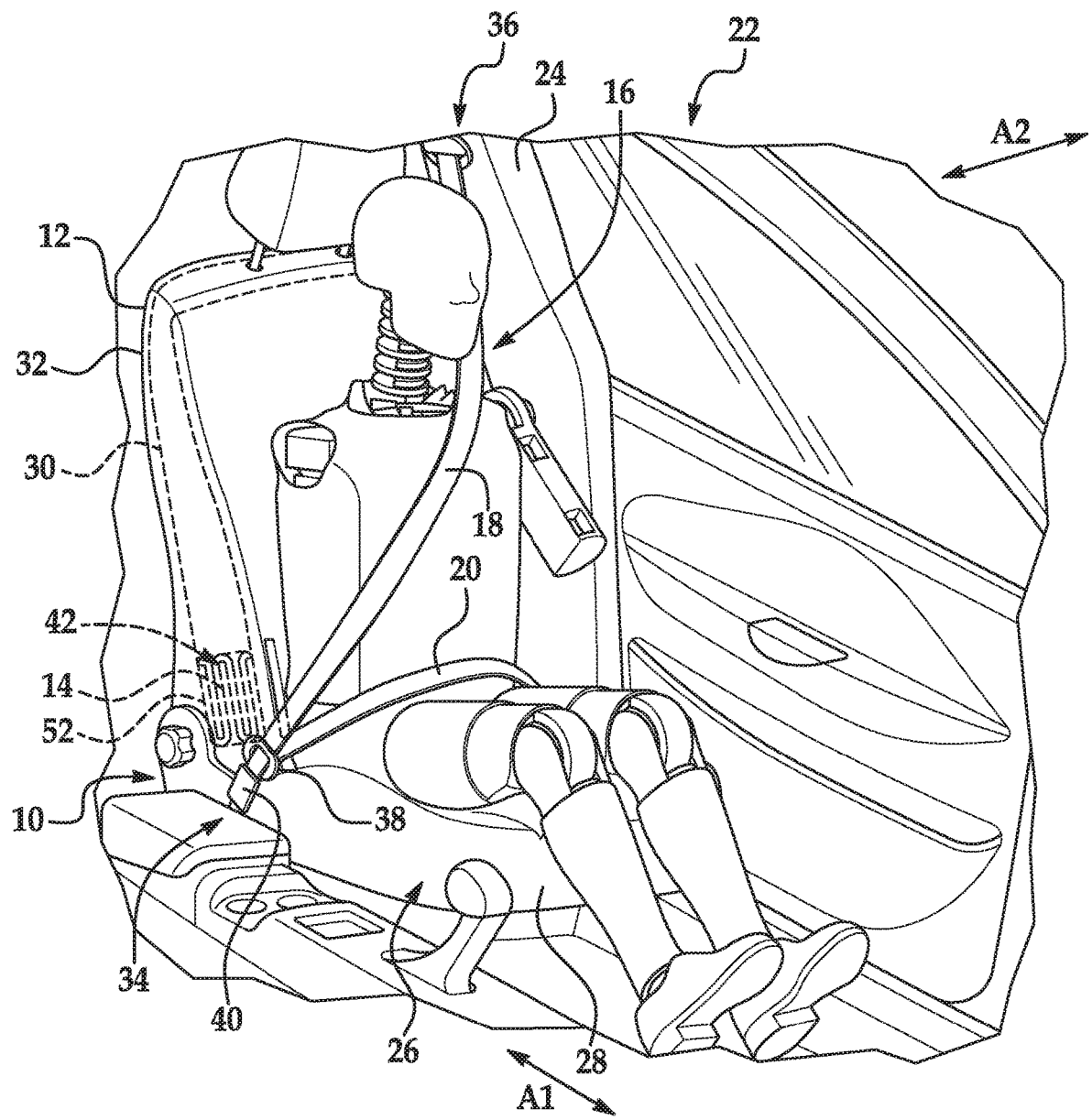
FIG. 1 is s perspective view of a seat on a left side of the vehicle and including an airbag at the right side of a seat back with the airbag in an uninflated position.

A system includes a seat back, an airbag mounted to the seat back, and a seatbelt webbing having a shoulder band and a lap band. The airbag is inflatable to an inflated position between the seat back and the shoulder band.

The airbag may be inflatable to the inflated position with the airbag biasing the shoulder band away from the seat back.

The airbag may be inflatable in a vehicle-forward direction toward the shoulder band.

The airbag may be above the lap band in the inflated position. The system may include a seat bottom, and the airbag may inflatable to the inflated position with the seatbelt between the airbag and the seat bottom. The airbag may be inflated in a vehicle-forward direction toward the shoulder band.

The system may include a seat bottom, the seat back having a bottom end and the airbag being at the bottom end of the seat back. The airbag may contact the seat bottom in the inflated position.

The airbag in the inflated position may be below a midpoint of the seat back.

The system may include a seatbelt buckle releasably engageable with the seatbelt webbing, the airbag being adjacent the seatbelt buckle. The seatbelt buckle may be on an inboard side of the seat back.

The airbag may have a vehicle-forward end in the inflated position, and the distance from the seat back to the vehicle-forward end in the inflated position is greater than a thickness of an abdomen of a 95$^{th}$ percentile male crash test dummy.

The airbag may have a depression receiving the seatbelt webbing in the inflated position. The system may have an internal tether connected to the depression. The system may include a housing supporting the airbag, the internal tether being connected to the housing.

The system may include a controller programmed to inflate the airbag in response to an angular vehicle impact.

With reference to the Figures, wherein like numerals indicate like parts throughout the several views, a system 10 of a vehicle 22, e.g., a seat 26 assembly, includes a seat back 12 and an airbag 14 mounted to the seat back 12. A seatbelt webbing 16 has a shoulder band 18 and a lap band 20. The airbag 14 is inflatable to an inflated position between the seat back 12 and the shoulder band 18.

When the airbag 14 is inflated, the airbag 14 exerts a force on the shoulder band 18 to loosen the shoulder band 18 across a chest of the occupant. For example, the airbag 14 may be inflated during an angular impact in which the momentum of the occupant urges the shoulder and chest of the occupant to turn into the shoulder band 18. In addition, the force exerted on the shoulder band 18 may pull the shoulder band 18 from a retractor 36 and may initiate load-limiting features of the retractor 36. The airbag 14 may be packaged in the seat back 12 with little or no packaging constraints.

The vehicle 22 may be any type of passenger or commercial automobile, such as a car, a truck, a sport utility vehicle, a crossover vehicle, a van, a minivan, a taxi, a bus, etc. The vehicle 22 defines a vehicle-longitudinal axis A1, e.g., extending between a front and a rear of the vehicle. The vehicle 22 defines a cross-vehicle axis A2, e.g., extending between a left side and a right side of the vehicle 22. The front, rear, left side, and right side are from the perspective of the vehicle 22 by an occupant in a forward-facing seat 26.

The vehicle 22 includes a body 24 defining a passenger cabin (not numbered) to house occupants, if any, of the vehicle 22. The passenger cabin may include one or more seats 26. One or more of the seats 26 may be disposed at a front of the passenger cabin and one or more of the seats 26 may be disposed behind the front seats. The passenger cabin may also include third-row seats (not shown) at a rear of the passenger cabin. In FIG. 1, the seat 26 is shown as a front seat. Alternatively, the seat 26 that supports the airbag may be a rear seat, third-row seat, etc. The position and orientation of the seats 26 and components thereof may be adjustable by an occupant. The vehicle 22 may include more than one airbag 14 at any suitable location, e.g., on one or more of the seats 26.

The seat 26 may include a seat back 12, a seat bottom 28, and a head restraint (not numbered). The head restraint may be supported by the seat back 12 and may be stationary or movable relative to the seat back 12. The seat back 12 may be supported by the seat bottom 28 and may be stationary or movable relative to the seat bottom 28. The seat back 12, the seat bottom 28, and/or the head restraint may be adjustable in multiple degrees of freedom. Specifically, the seat back 12, the seat bottom 28, and/or the head restraint may themselves be adjustable, in other words, adjustable components within the seat back 12, the seat bottom 28, and/or the head restraint, and/or may be adjustable relative to each other.

The seat bottom 28 and/or the seat back 12 may include a frame 30 (numbered in FIG. 1) and a covering 32 supported on the frame 30. The frame 30 may include tubes, beams, etc. The frame 30 may be formed of any suitable plastic material, e.g., carbon fiber reinforced plastic (CFRP), glass fiber-reinforced semi-finished thermoplastic composite (organosheet), etc. As another example, some or all components of the frame 30 may be formed of a suitable metal, e.g., steel, aluminum, etc.

The covering 32 may include upholstery and padding. The upholstery may be formed of cloth, leather, faux leather, or any other suitable material. The upholstery may be stitched in panels around the frame. The padding may be between the covering and the frame and may be foam or any other suitable material.

The vehicle 22 includes a seatbelt assembly 34 having a seatbelt webbing 16, a retractor 36, a clip 38, and a seatbelt buckle 40. The seatbelt assembly 34 may be, for example, a three-point harness, meaning that the seatbelt webbing 16 is attached at three points around the occupant when fastened, e.g., a lap-belt mounting (not numbered), the retractor 36, and the buckle 40. The seatbelt assembly 34 may, alternatively, include another arrangement of attachment points. As a three-point harness, the lap band mounting attaches one end of the webbing 16 to the frame of the seat bottom 28 or the body 24 of the vehicle 22. The other end of the webbing 16 feeds into the retractor 36, which may include a spool that extends and retracts the webbing 16. The retractor 36 may be mounted to the frame of the seat back 12 or the body 24 of the vehicle 22. In the example shown in the figures, the retractor 36 is mounted to an upper end of pillar of the body 24 and the lap band mounting is at a lower end of the pillar.

The seatbelt buckle 40 is releasably engageable with the seatbelt webbing 16. Specifically, the clip 38 slides freely along the webbing 16 and is releasably engageable with the seatbelt buckle 40. When engaged with the seatbelt buckle 40, the clip 38 divides the seatbelt webbing 16 into the lap band 20 and the shoulder band 18.

The airbag assembly 42 includes the airbag 14 and an inflator 44. The airbag assembly 42 may include a housing 46. The airbag 14 and/or the inflator 44 may be supported by the housing 46. The airbag 14 may be disposed in the housing 46 in the uninflated position and, in such an example, the housing 46 provides a reaction surface for the airbag 14 in the inflated position. The housing 46 may be supported by the frame 30 of the seat back 12. As another example, the housing 46 may be supported by the frame of the seat bottom 28. The housing 46 may be of any material, e.g., a rigid polymer, a metal, a composite, etc. The housing 46 may be concealed by the covering 32 of the seat back 12 when the airbag 14 is uninflated, and the covering 32 may include a tear seam through which the airbag 14 erupts when the airbag 14 is inflated.

The airbag 14 may be a woven polymer or any other material. As one example, the airbag 14 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The inflator 44 is in fluid communication with the airbag 14. Upon receiving a signal from, e.g., a controller 48 (described below), the inflator 44 may inflate the airbag 14 with an inflatable medium, such as a gas. The inflator 44 may be, for example, a pyrotechnic inflator that uses a chemical reaction to drive inflation medium to the airbag 14. The inflator 44 may be of any suitable type, for example, a cold-gas inflator.

The airbag 14 is inflatable to an inflated position between the seat back 12 and the shoulder band 18, as shown in FIGS. 2-4B. Specifically, the airbag 14 biases the shoulder band 18 away from the seat back 12 in the inflated position. The airbag 14 may directly contact the shoulder band 18 in the inflated position to push the shoulder band 18 away from the seat back 12. For example, the airbag 14 may push the shoulder band 18 upwardly and/or forwardly away from the seat back 12. As set forth above, when the airbag 14 is inflated, the airbag 14 exerts a force on the shoulder band 18 to loosen the shoulder band 18 across the chest of the occupant. In examples in which the seat 26 is forward facing, the airbag 14 is inflatable in a vehicle-forward direction toward the shoulder band 18.

Figure 2:
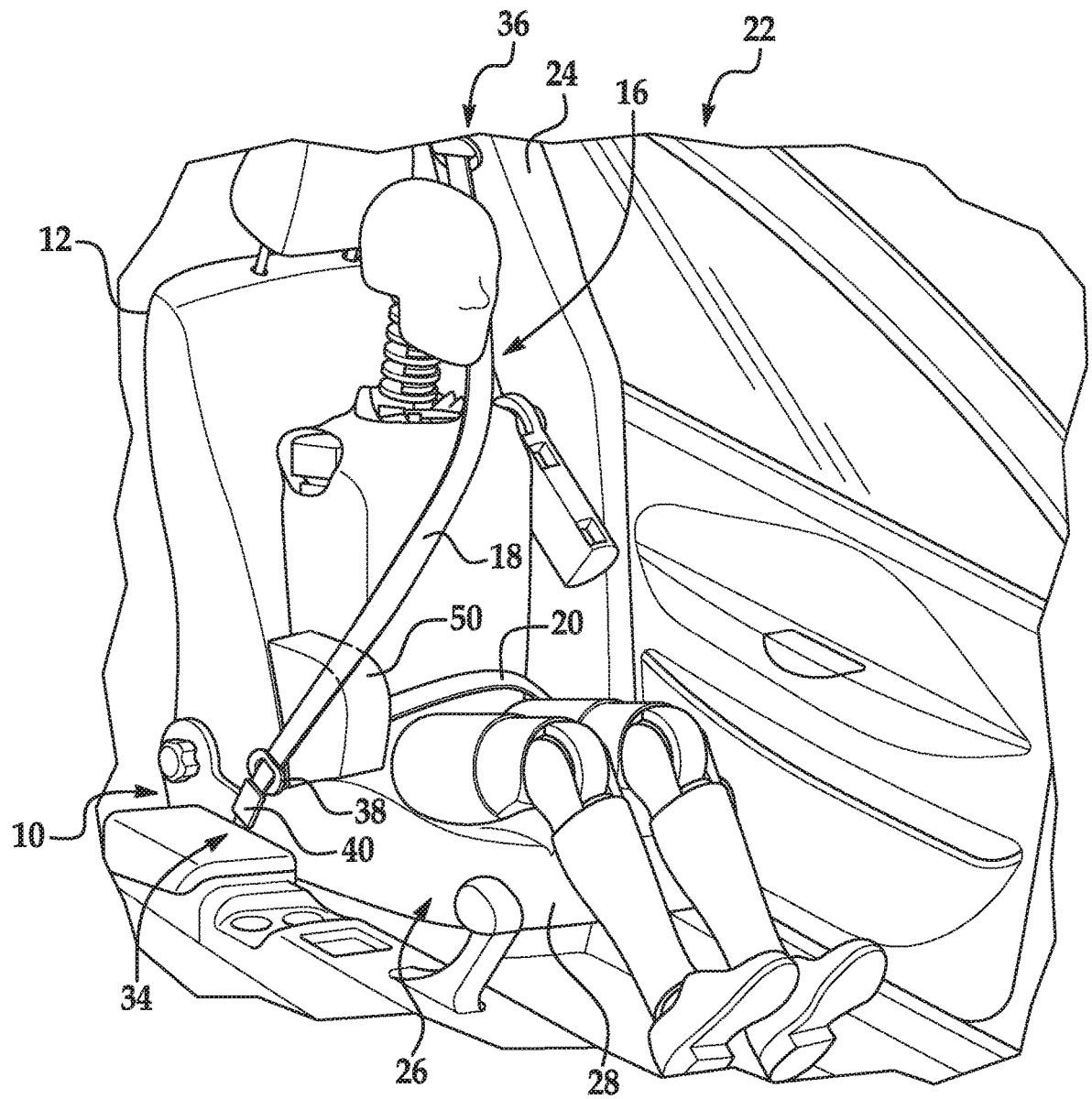
FIG. 2 is the perspective view of FIG. 2 with the airbag in an inflated position.
Figure 3A:
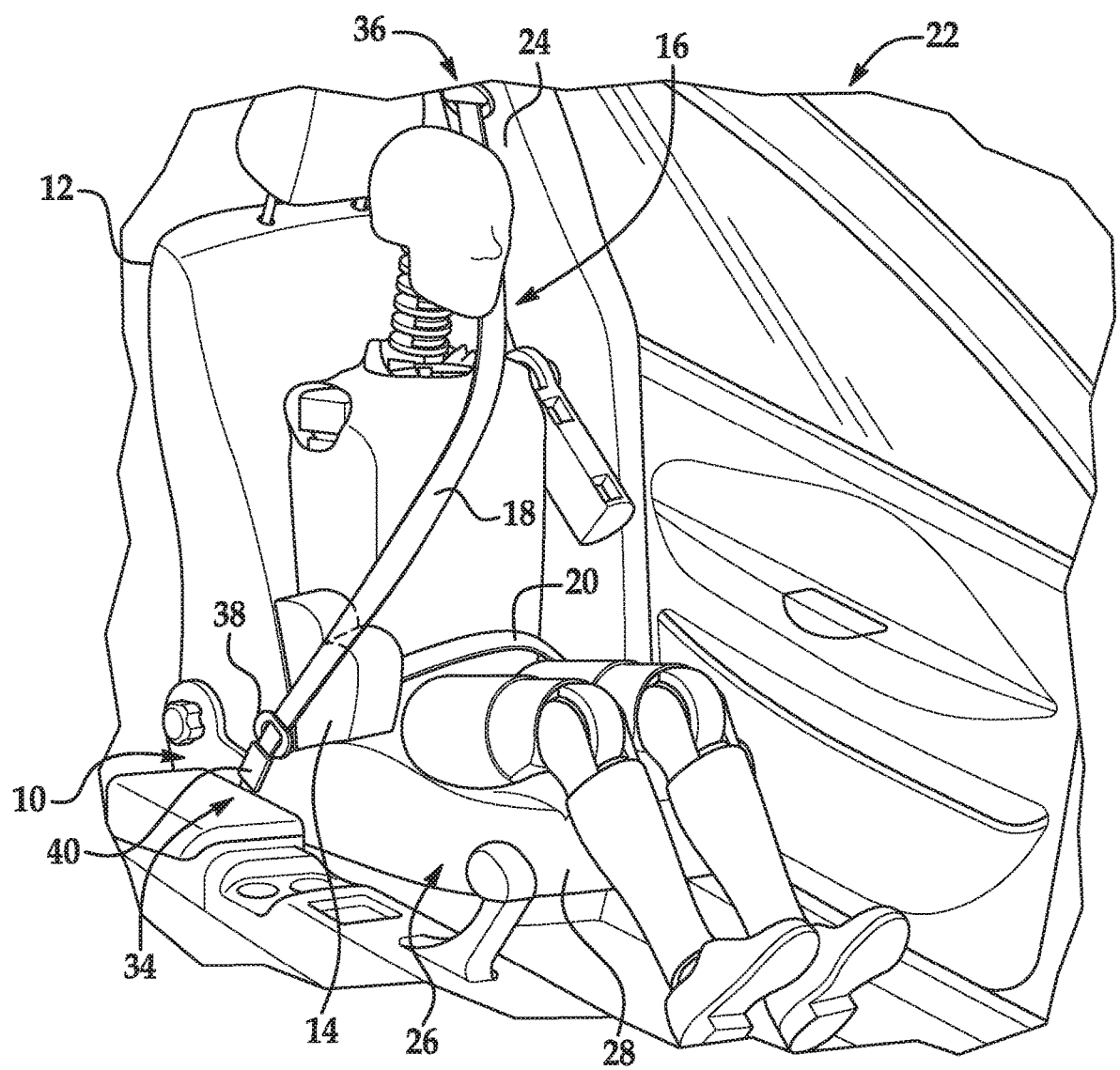
FIG. 3A is a perspective view of the seat with another example of the airbag.
Figure 4A:
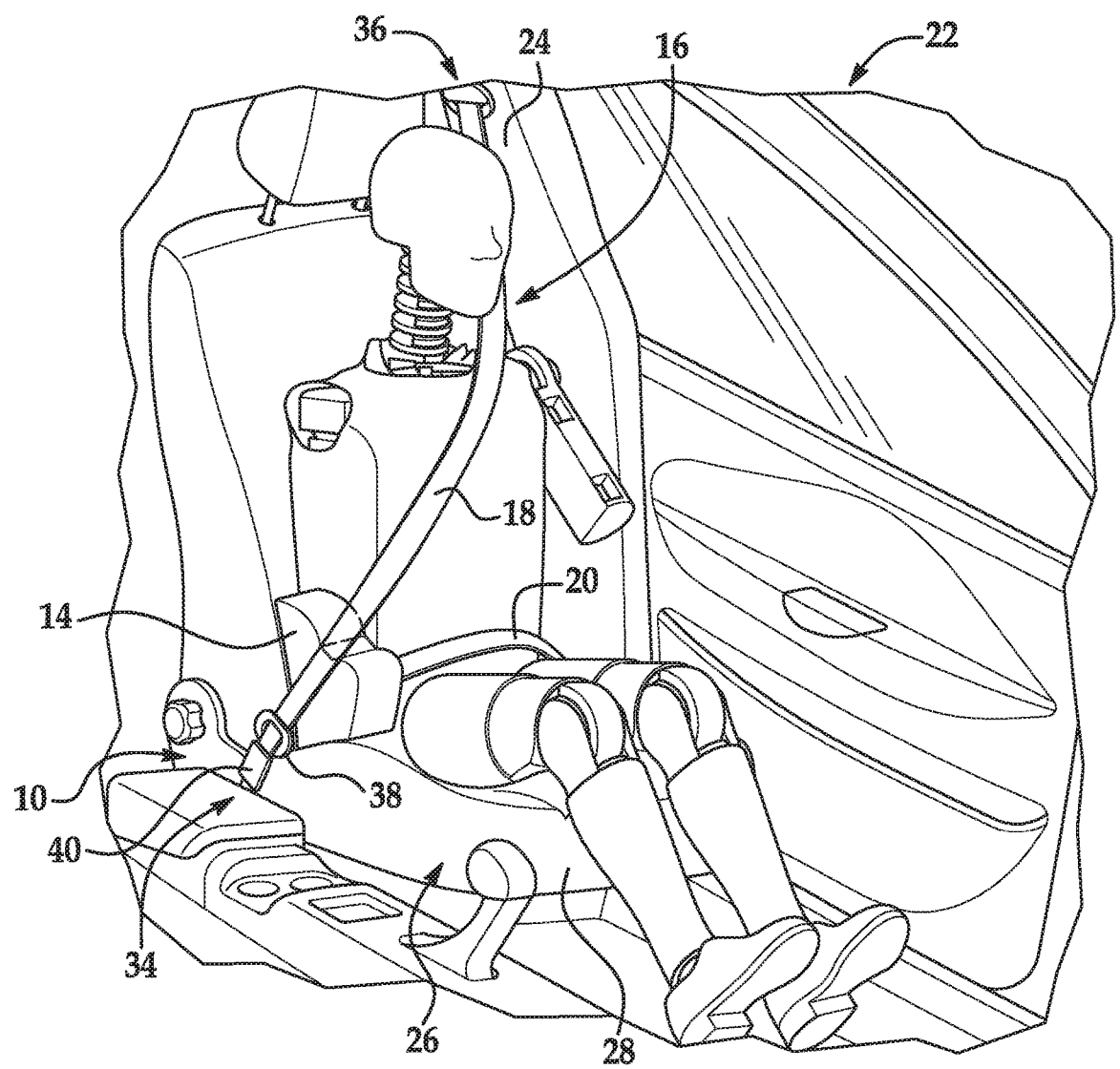
FIG. 4A is a perspective view of the seat with another example of the airbag.

The airbag 14 has a forward end 50 in the inflated position. The forward end 50 biases the shoulder band 18 away from the seat back 12 in the inflated position, e.g., by contacting the shoulder band 18. The distance from the seat back 12 to the forward end 50 in the inflated position may be greater than a thickness of an abdomen of a $95^{th}$ percentile male crash test dummy, as shown in FIGS. 2, 3A, and 4A. Accordingly, when the airbag 14 is inflated, the airbag 14 lifts the shoulder band 18 away from the crash test dummy to loosen the shoulder band 18 across the chest of the crash test dummy. In examples where the seat 26 is forward facing, the forward end 50 may be a vehicle-forward end 50 of the airbag 14. The forward end 50 may curve toward the seat back 12, as shown in FIG. 2, and in any event, is the surface of the airbag 14 that pushes the shoulder band 18 upwardly and/or forwardly away from the seat back 12, e.g., the portion of the airbag that contacts the shoulder band 18.

The airbag 14 is adjacent the seatbelt buckle 40. In other words, in the inflated position, nothing is between the airbag 14 and the seatbelt buckle 40. The airbag 14 may contact the seatbelt buckle 40 or may be spaced from the seatbelt buckle 40 in the inflated position. The airbag 14 in the inflated position biases the shoulder band 18 away from the occupant at a position of the shoulder band 18 adjacent the clip 38 and seatbelt buckle 40.

The seatbelt buckle 40 and the airbag 14 may be on an inboard side of the seat back 12. In other words, the seat back 12 is between the buckle 40 and portion of the body 24 and/or a door of the vehicle 22 adjacent the seat back 12. Said differently, the seatbelt buckle 40 may be between the seat back 12 and a centerline of the vehicle 22.

The airbag 14 in the inflated position is below a midpoint of the seat back 12 to align the airbag 14 with the shoulder band 18 near the seatbelt buckle 40. For example, the airbag 14 may be at a bottom end of the seat back 12. Specifically, the housing 46 may be mounted to a bottom end 52 of the frame 30 of the seat back 12. This positioning allows for the airbag 14 to be packaged in the seat back 12 with little or no packaging constraints. In other words, the area of the seat back 12 in which the airbag assembly 42 is packaged may be devoid of other components that would interfere with the packaging of the airbag assembly 42 in the seat back 12.

The airbag 14 is above the lap band 20 in the inflated position. In other words, the airbag 14 does not move the lap band 20 away from the seat back 12 when the airbag 14 inflates. When the airbag 14 is in the inflated position, the lap band 20 is positioned vertically between the airbag 14 and the seat bottom 28. The airbag 14 may contact the seat bottom 28 in the inflated position. In such an example, a portion of the airbag 14 may contact the seat bottom 28 and a portion of the airbag 14 may contact the lap band 20 pinching the lap band 20 between the airbag 14 and the seat bottom 28.

With reference to FIG. 2, in one example, the airbag 14 may be generally rectangular in shape. As other example, the airbag 14 may be rounded, oval, etc. In these examples, the forward end 50 of the airbag 14 is the farthest surface of the airbag 14 from the seat back 12. In such examples, the forward end 50 may be a generally flat panel.

With reference to FIGS. 3A-4B, the airbag 14 may have a depression 54 that receives the shoulder band 18 when the airbag 14 is in the inflated position. In such an example, the forward end 50 of the airbag 14 is at the depression 54. In these examples, the forward end 50 is spaced from the airbag 14 and may not be the forward-most end 56 of the airbag 14. For example, the examples of the airbag 14 shown in FIGS. 3A-4B, the airbag 14 includes a forward-most end 56 that is spaced from the seat back 12 farther than the forward end 50. In any event, the forward end 50 engages the shoulder band 18 to bias the shoulder band 18 away from the seat back 12. The depression 54 may position and retain the shoulder band 18 relative to the airbag 14.

Figure 3B:
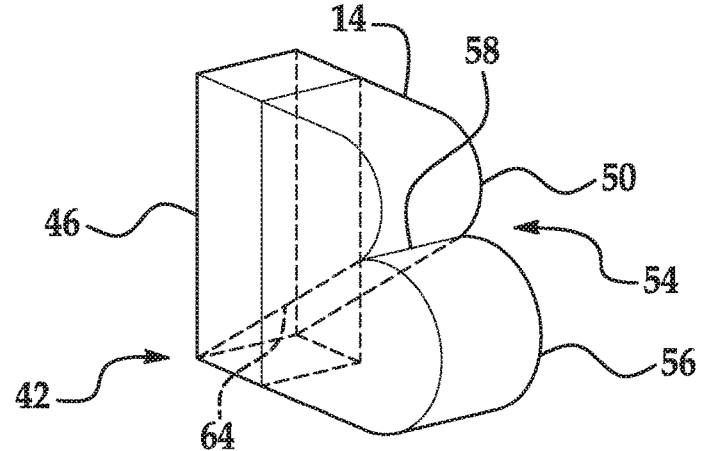
FIG. 3B is a perspective view of an airbag assembly including the example of the airbag shown in FIG. 3A.
Figure 4B:
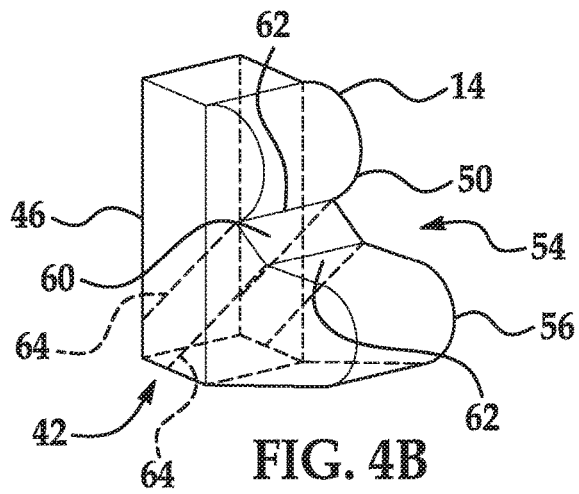
FIG. 4B is a perspective view of an airbag assembly including the example of the airbag shown in FIG. 4A.

The depression 54 may be generally V-shaped, as shown in FIGS. 3A-B. In other words, the depression 54 may have a single, linear bottom 58. As another example, the depression 54 may be U-shaped, as shown in FIGS. 4A-B. In other words, the depression 54 may have a flat portion 60, e.g., a flat panel, and two wall portions 62 extending away from the flat portion 60 in a generally common direction. As an example, the airbag assembly 42 may include an internal tether 64 connected to the depression 54. The internal tether 64 may, for example, be connected to the housing 46 and/or the frame 30 of the seat back 12.

Figure 5:
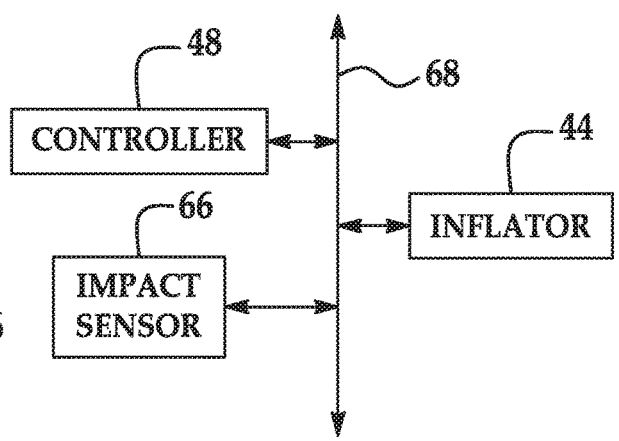
FIG. 5 is a block diagram of a system of the vehicle.

With reference to FIG. 5, the vehicle 22 may include a controller 48, i.e., a computer, programmed to inflate the airbag 14 in response to an angular vehicle impact. The controller 48 may be, for example, a restraints control module. The vehicle 22 may include impact sensors 66 that sense vehicle impact. In the event of an impact, the impact sensor 66 may detect the impact and transmit a signal through a communications network to the controller 48. The controller 48 may transmit a signal through the communications network to the inflator 44, in which case the inflator 44 discharges and inflates the airbag 14.

The controller 48 may be in communication with a communication network 68 of the vehicle 22 to send and/or receive instructions to and from components of the vehicle 22. In other words, the controller 48 is a computer. The controller 48 may be a microprocessor-based computer implemented via circuits, chips, or other electronic components for carrying out various operations, including as described herein. The controller 48 is a computer that generally includes a processor and a memory, the memory including one or more forms of computer-readable media and storing instructions executable by the processor for performing various operations, including as disclosed herein. The memory of the controller 48 further generally stores remote data received via various communications mechanisms; e.g., the controller 48 is generally configured for communications on the controller 48 area network (CAN) bus or the like, and/or for using other wired or wireless protocols, e.g., Bluetooth, etc. The controller 48 may also have a connection to an onboard diagnostics connector (OBD-II). Via a communication network using Ethernet, WiFi, the CAN bus, Local Interconnect Network (LIN), and/or other wired or wireless mechanisms, the controller 48 may transmit messages to various devices in the vehicle 22 and/or receive messages from the various devices, e.g., controllers, actuators, sensors, etc., e.g., controllers and sensors as discussed herein.

With reference to FIG. 5, the vehicle 22 may include one or more impact sensors 66. The impact sensors 66 may be in communication with the controller 48. The impact sensors 66 are programmed to detect a collision to the vehicle 22. Specifically, the impact sensors 66 are programmed to detect an angular impact and/or the controller 48 is programmed to identify that an impact is an angular impact based on detection data from the impact sensors 66. The impact sensors 66 may be of any suitable type, for example, post-contact sensors such as accelerometers, pressure sensors, and contact switches; and pre-impact sensors 66 such as radar, LIDAR, and vision-sensing systems. The vision-sensing systems may include one or more cameras, CCD image sensors, CMOS image sensors, etc. The frontal impact sensor may be located at numerous points in or on the vehicle 22.

The controller 48 may be programed to detect an angular vehicle impact and to inflate the airbag 14 in response to the angular vehicle impact. "In response to" indicates a causal relationship, not merely a temporal relationship. Specifically, in the event of an angular vehicle impact, the controller 48 receives signals from the impact sensors 66 indicating detection of a vehicle impact. The impact sensors 66 may detect that the impact is an angular vehicle impact and/or the controller 48 may determine that the impact is an angular vehicle impact based on the information transmitted from the impact sensors 66. The airbag 14 may be inflatable only in response to an angular vehicle impact. In other words, the controller 48 may be programmed to refrain from instructing the airbag 14 to inflate when other types of vehicle impacts are detected.

An angular vehicle impact causes the occupant to move forward and to twist. An angular vehicle impact includes an oblique vehicle impact, i.e., offset deformable barrier (OBD). Another example of an angular impact is small offset rigid barrier (SORB). The angular impact may be on the opposite side of the vehicle from the seat 26, i.e., causing the outboard shoulder of the occupant to twist inboard. For example, for a seat 26 positioned on a left side of the vehicle 22 and facing forward, an angular impact on the right side of the vehicle 22 may cause the left shoulder of the occupant to twist toward the right. In such an example, the airbag 14 may be positioned on the right side of the occupant, i.e., the right side of the seat back 12. Similarly, for a seat 26 positioned on a right side of the vehicle 22 and facing forward, an angular impact on the left side of the vehicle 22 may cause the right shoulder of the occupant to twist toward the left.

When the airbag 14 is inflated, the airbag 14 exerts a force on the shoulder band 18 to loosen the shoulder band 18 across a chest of the occupant. In addition, the force exerted on the shoulder band 18 may pull the shoulder band 18 from a retractor 36 and may initiate load-limiting features of the retractor 36.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising:
   a seat back;
   an airbag mounted to the seat back;
   a seatbelt webbing having a shoulder band and a lap band; and the airbag inflatable to an inflated position between the seat back and the shoulder band;

the airbag being inflatable in a vehicle-forward direction toward the shoulder band.

2. The system as set forth in claim 1, wherein the airbag is inflatable to the inflated position with the airbag biasing the shoulder band away from the seat back.

3. The system as set forth in claim 1, wherein the airbag is above the lap band in the inflated position.

4. The system as set forth in claim 3, further comprising a seat bottom, wherein the airbag is inflatable to the inflated position with the seatbelt webbing between the airbag and the seat bottom.

5. The system as set forth in claim 1, further comprising a seat bottom, the seat back having a bottom end and the airbag being at the bottom end of the seat back.

6. The system as set forth in claim 5, wherein the airbag contacts the seat bottom in the inflated position.

7. The system as set forth in claim 1, wherein the airbag in the inflated position is below a midpoint of the seat back.

8. The system as set forth in claim 1, further comprising a seatbelt buckle releasably engageable with the seatbelt webbing, the airbag being adjacent the seatbelt buckle.

9. The system as set forth in claim 8, wherein the seatbelt buckle is on an inboard side of the seat back.

10. The system as set forth in claim 1, wherein the airbag has a vehicle-forward end in the inflated position, and the distance from the seat back to the vehicle-forward end in the inflated position is greater than a thickness of an abdomen of a $95^{th}$ percentile male crash test dummy.

11. The system as set forth in claim 1, wherein the airbag has a depression receiving the seatbelt webbing in the inflated position.

12. The system as set forth in claim 11, further comprising an internal tether connected to the depression.

13. The system as set forth in claim 12, further comprising a housing supporting the airbag, the internal tether being connected to the housing.

14. The system as set forth in claim 1, further comprising a controller programmed to inflate the airbag in response to an angular vehicle impact.

15. A system, comprising:
a seat back;
an airbag mounted to the seat back;
a seatbelt webbing having a shoulder band and a lap band;
the airbag inflatable to an inflated position between the seat back and the shoulder band; and
a seat bottom, the seat back having a bottom end and the airbag being at the bottom end of the seat back.

16. The system as set forth in claim 15, wherein the airbag contacts the seat bottom in the inflated position.

17. The system as set forth in claim 15, wherein the airbag is above the lap band in the inflated position.

18. A system, comprising:
a seat back;
an airbag mounted to the seat back;
a seatbelt webbing having a shoulder band and a lap band; and
the airbag inflatable to an inflated position between the seat back and the shoulder band;
the airbag having a vehicle-forward end in the inflated position, and the distance from the seat back to the vehicle-forward end in the inflated position being greater than a thickness of an abdomen of a $95^{th}$ percentile male crash test dummy.

19. The system as set forth in claim 18, further comprising a seat bottom, the seat back having a bottom end and the airbag being at the bottom end of the seat back.

20. The system as set forth in claim 18, wherein the airbag in the inflated position is below a midpoint of the seat back.

\* \* \* \* \*